United States Patent [19]
Farago et al.

[11] Patent Number: 6,134,669
[45] Date of Patent: Oct. 17, 2000

[54] PRINTER POWERED PRINTER DRIVER

[75] Inventors: Steve Farago, Mt. Kisco, N.Y.; Gabor Lederer, Hackensack; Donald Wilcox, Paramus, both of N.J.

[73] Assignee: Trans World Marketing Corp., East Rutherford, N.J.

[21] Appl. No.: 09/049,359

[22] Filed: Mar. 27, 1998

Related U.S. Application Data

[60] Provisional application No. 60/042,104, Mar. 27, 1997.

[51] Int. Cl.[7] ....................................................... G06F 1/32
[52] U.S. Cl. ............................ 713/322; 713/600; 710/64; 364/710.13
[58] Field of Search ..................................... 710/1, 72–74, 710/62–64; 713/300–340, 500, 501, 600, 601; 364/710.13; 358/1.1, 1.14

[56] References Cited

U.S. PATENT DOCUMENTS

| | | | |
|---|---|---|---|
| 4,607,170 | 8/1986 | Wickman | 307/147 |
| 4,763,292 | 8/1988 | Kotani et al. | 708/173 |
| 4,866,602 | 9/1989 | Hall | 710/1 |
| 4,901,217 | 2/1990 | Wilson | 363/126 |
| 5,125,077 | 6/1992 | Hall | 710/1 |
| 5,179,710 | 1/1993 | Coschieri | 713/300 |
| 5,438,678 | 8/1995 | Smith | 713/300 |
| 5,457,785 | 10/1995 | Kikinis et al. | 710/128 |
| 5,490,283 | 2/1996 | Chin | 710/73 |
| 5,514,859 | 5/1996 | Seigel | 235/462.15 |
| 5,530,845 | 6/1996 | Hiatt et al. | 703/27 |
| 5,550,985 | 8/1996 | Miller et al. | 713/324 |
| 5,555,374 | 9/1996 | Armerding et al. | 710/2 |
| 5,572,735 | 11/1996 | Tanikawa | 713/300 |
| 5,615,344 | 3/1997 | Corder | 710/129 |
| 5,659,800 | 8/1997 | Zhang et al. | 710/62 |
| 5,664,204 | 9/1997 | Wang | 713/300 |
| 6,042,278 | 3/2000 | Spencer et al. | 400/61 |

*Primary Examiner*—Ayaz R. Sheikh
*Assistant Examiner*—Sumati Lefkowitz
*Attorney, Agent, or Firm*—Ostrolenk, Faber, Gerb & Soffen, LLP

[57] ABSTRACT

A Product Actuation Demonstration System (PADS) is powered from a product to which it is connected. The PADS includes a control module and an image storage module where the control module includes a local power generator which ensures that the power delivery capabilities of the product to be demonstrated are not exceeded while the power requirements of the control module and the image storage module are met.

19 Claims, 3 Drawing Sheets

PRINTER POWERED PRINTER DRIVER

CROSS REFERENCE TO RELATED APPLICATION

This application is based on and claims priority to U.S. Provisional Patent Application No. 60/042,104, filed Mar. 27, 1997, entitled PRINTER POWERED PRINTER DRIVER.

BACKGROUND OF THE INVENTION

The present invention relates to an electronic circuit which provides printing command instructions to a printer. More particularly, the present invention relates to a digital circuit which derives its operating power from a printer to which the digital circuit is connected and transmits printing command instructions thereto.

BACKGROUND OF THE ART

Conventional computer peripheral devices which interface with computer systems require operating power. Typically, operating power is drawn from a conventional 120 volt a/c power receptacle, converted to low voltage d/c power and delivered to the electronic circuitry of the peripheral device. In some cases the circuitry required to convert from a/c power to d/c power is disposed within the peripheral device and, in other cases, such circuitry is disposed outside the peripheral device, for example, in a power pack.

Conventional peripheral devices may also derive operating power from a standard interface port of a computer to which the peripheral device is connected. For example, a computer mouse is typically connected to a standard RS-232 communications port of a personal computer. The mouse requires operating power to energize the internal electronic circuitry of the mouse. In some instances, power for operating the mouse is drawn from the standard RS-232 communications interface, particularly the hand shaking signals which are provided from the personal computer to the mouse.

When designing the electronic circuitry of the mouse, care must be taken not to exceed the limitations of the available voltage and current drawn from the hand shaking signals provided from the personal computer over the RS-232 communications interface because such hand shaking signals have specific voltage and current capabilities which may not be exceeded.

The advantage of designing peripheral devices which derive operating power from the signals available on standard communication interface ports is that costly and weighty power conversion circuits are not required, thereby enabling less expensive and smaller interface devices to be produced.

Unfortunately, designers desirous of producing a peripheral device which derives operating power from the signals available on standard communication interface ports are disadvantaged in that they must design the peripheral device so that it does not draw more power over the communications interface port than the personal computer can deliver. In some instances, a peripheral device is incapable of drawing operating power from a standard communications interface port because the signals available from the interface port cannot provide the requisite power necessary to operate the peripheral device.

SUMMARY OF THE INVENTION

There is a need for an improved peripheral device which is capable of providing printing command instructions to a printer where the peripheral device draws its operating power from the low voltage power supply of the printer. Such a peripheral device must be capable of demonstrating the capabilities of the printer without requiring a complete computer system to provide printing command instructions to the printer. Indeed, there exists a need for a small, lightweight, inexpensive and easy-to-use peripheral device which connects to a printer via a standard electronics interface port where the electronic circuitry of the peripheral device draws operating power from the printer over the electronics interface port.

Printers having parallel interface connectors which strictly follow the IEEE printer interface protocol do not carry signals capable of delivering the requisite power to operate a peripheral device for delivering command instructions to the printer. Although such printers may have signals available on the parallel port which provide the required voltage to operate a peripheral device (i.e., handshaking signals, etc.), these signals cannot necessarily deliver the current necessary to properly power the electronic circuits of the peripheral device as described above.

Consequently, efforts have been abandoned to design and manufacture a peripheral device capable of providing command instructions to certain printers which draws operating power over the parallel port from the printers to which it is connected.

One example of a printer which has heretofore been incapable of providing operating power to a peripheral device as described above is the Epson™ printer. The Epson™ printer provides hand shaking signals on pins 13, 18 and 35 of a parallel interface port, which signals reach a potential of 5 volts. Unfortunately, those signals provide very little output current (i.e., from about 1 to 5 milli-amps) and, therefore, attempts to design a peripheral device which can provide command instructions to the Epson™ printer and draw operating power therefrom have heretofore been abandoned.

To overcome the shortcomings and disadvantages of the prior art, the preferred embodiment of the present invention includes an interface for coupling a printer control circuit to a printer, a data storage device for storing control command signals and permitting the control command signals to be transferred to the printer over the interface, a control circuit for receiving a control signal from the printer over the interface which indicates that the printer cannot accept data and producing a signal which disables the data storage device in response thereto and a power storage device coupled to a source of power within the printer over the interface, where the storage device accumulates more power when the printer cannot accept data.

Advantageously, the present invention capitalizes on the low power draw of the data storage device (and other devices) when they are disabled which permits the power storage device to charge. However, when the power storage device draws power from the subject printer through the interface connector, the maximum power draw permitted by the subject printer is not exceeded. Thus, the power storage device accumulates power obtained from the subject printer for later use when the data storage device (and other devices) are again enabled.

Other features and advantages of the present invention will become apparent from the following description of the invention which refers to the accompanying drawings.

BRIEF DESCRIPTION OF THE DRAWINGS

For the purpose of illustrating the invention, there is shown in the drawing a form which is presently preferred, it being understood, however, that the invention is not limited to the precise arrangement and instrumentality shown.

DETAILED DESCRIPTION OF A PREFERRED EMBODIMENT

Figure 1:
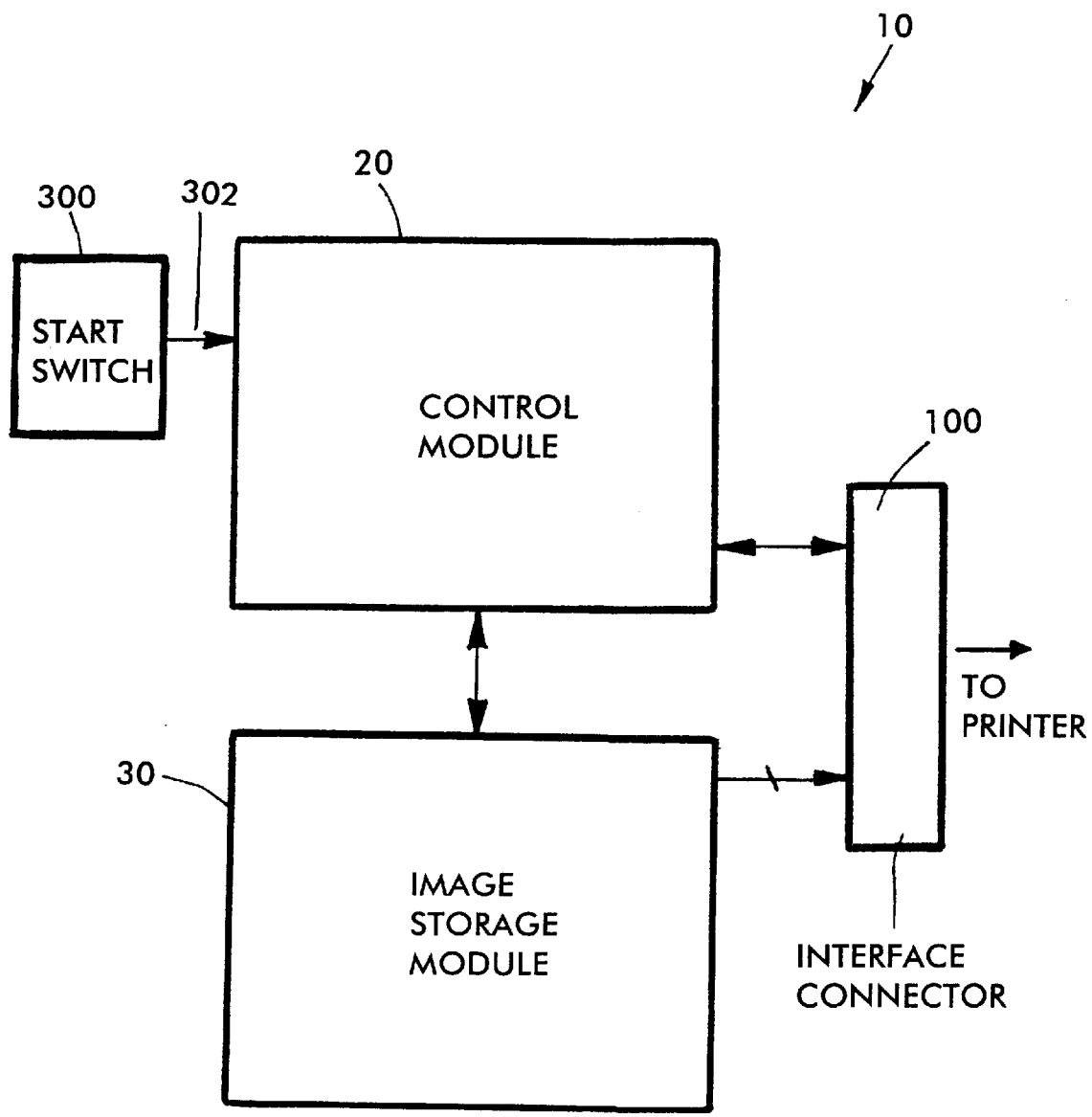
FIG. 1 shows a block diagram of the electronic circuit of the present invention.

Referring now to the drawings wherein like numerals indicate like elements, there is shown in FIG. 1 a block diagram of an electronic circuit capable of providing command instructions to a printer in accordance with the preferred embodiment of present invention. The electronic circuit is referred to herein as a Product Actuation and Demonstration System (PADS) 10.

The PADS 10 includes a control module 20, an image storage module 30, a start switch 300 and an interface connector 100. The interface connector is adapted to couple to a printer (not shown). It is preferred that the interface connector 100 be a standard parallel interface connector which adheres to the IEEE protocol and that the connector be compatible with a plurality of printers.

The control nodule 20 receives, inter alia, power from the printer over the interface connector 100 to power both itself and the image storage module 30. The control module 20 is user activated via the start switch 300 which enables the image storage module to release printer control commands to the printer via the interface connector 100.

The control module 20 and the image storage module 30 be dis-engageable from one another via a mechanical and electrical coupling element such as a standard interface connector (not shown). This makes it possible to store different images in different image storage modules 30 and to cause a desired image to be printed by the printer by coupling the corresponding image storage module 30 to the control module 20.

It is also preferred that the start switch 300 be electrically coupled to the control module 20 via a cable 302 such that, when the PADS 10 is connected to the printer, the start switch 300 is easily accessible to a user.

Generally, the function of the image storage module 30 includes storing printer command instructions for later delivery to a printer to be demonstrated. It is preferred that the image storage module 30 be adapted to receive the printer command instructions from an external apparatus, for example, a programming device and that the printer command instructions be stored in the module 30 in digital form. The programming device may be any conventional programming device known or available in the art.

The functions of the control module 20 include handshaking with the printer to be demonstrated, providing power to the image storage module 30 and disabling at least some portions of the circuitry in the control module 20 and the image storage module 30 in response to the status of the printer.

When a user presses the start switch 300, the printer command signals stored in the memory module 30 are transmitted to the printer (not shown) via the interface 100 causing the printer to print an image.

Figure 2:
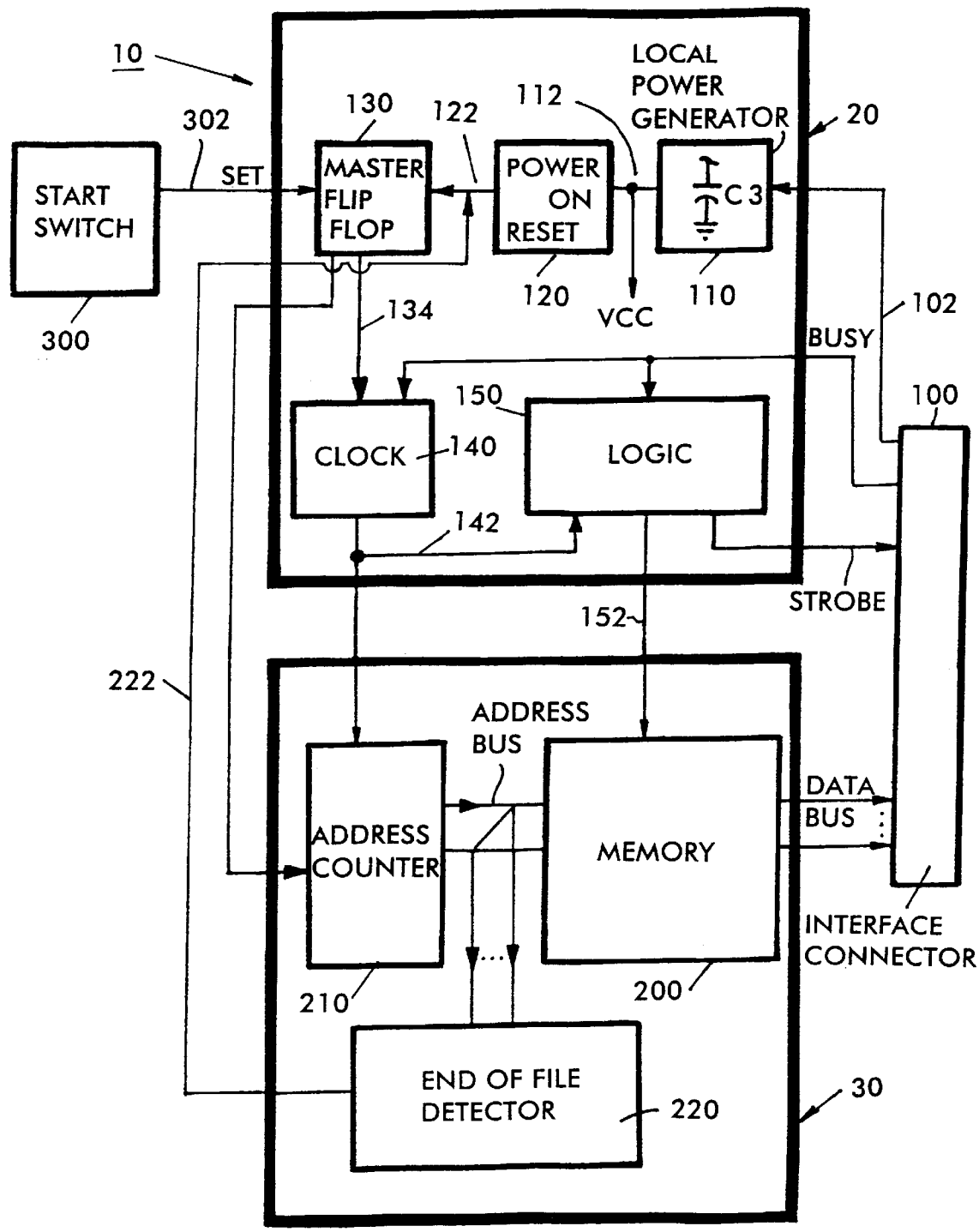
FIG. 2 is a more detailed block diagram of the electronic circuit of the present invention.

Reference is now made to FIG. 2 which shows a more detailed block diagram of the PADS 10. The control module 20 preferably includes a local power generator 110, a power on reset circuit 120, a master flip-flop circuit 130, a clock 140 and a logic circuit 150. The image storage module 30 includes a memory 200, an end of file detector 220, and an address counter 210. It is understood that the partitioning of circuit blocks within the control and image storage modules 20, 30 is not required and many other distributions of circuits may be made which fall within the scope of the invention.

The interface 100 is connected to the local power generator 110 (preferably including one or more capacitors C3) of the control module 20 via line 102. Line 102 may include a plurality of lines from the interface connector 100. The local power generator 110 is coupled to the power on reset circuit 120 via line 112. It is preferred that line 112 reaches approximately 5 volts in steady state.

The power on reset circuit 120 is coupled to the master flip-flop circuit 130 via reset line 122. It is preferred that a reset signal on reset line 122 is active low and that the reset signal reaches approximately 5 volts in steady state. The start switch 300 is also coupled to the master flip-flop circuit 130 via line 302 which provides a set signal to the master flip flop circuit 130. It is preferred that the set signal be active low and that the set signal reaches approximately 5 volts in steady state.

The master flip-flop circuit 130 is coupled to a clock circuit 140 via line 134. It is preferred that the electrical signal on line 134 enables the operation of the clock circuit 140 when the voltage on line 134 is approximately 5 volts and disables the clock circuit 140 when the voltage on line 134 is approximately 0 volts. It is preferred that the clock circuit 140 operates at a frequency of about 1–2 MHz.

The clock circuit 140 is coupled to the logic circuit 150 via a clock signal on line 142. The logic circuit 150 uses the clock signal on line 142, and other signals to be described later, to produce a STROBE signal which is coupled to interface connector 100. The STROBE signal provides an indication to the printer that data on the DATA BUS is valid.

The address counter 210 of the image storage module 30 receives input from the clock circuit 140 and the master flip-flop circuit 130. Specifically, the address counter 210 receives a clock signal on line 142 from the clock circuit 140 and a reset signal on line 132 from the master flip-flop circuit 130. The clock signal on line 142 controls the incrementation of the address counter 210 while the reset signal on line 132, when active, causes the address counter 210 to start counting from a predetermined initial value (preferably 0).

The address counter 210 provides an address to the memory 200 via an ADDRESS BUS. It is preferred that the ADDRESS BUS consist of twenty (20) lines so that 1 megabyte of printer commands may be stored, however, other sizes are also contemplated and covered by the invention. It is also preferred that the data on the ADDRESS BUS be incremented by one in accordance with the clock signal on line 142.

The ADDRESS BUS is also input to the end-of-file detector 220. The end-of-file detector 220 monitors the count on the ADDRESS BUS and provides a reset signal to the master flip flop circuit 130 on line 222. It is preferred that only a subset of the ADDRESS BUS lines be input to the end-of-file detector 220 from the address counter 210 for simplifying the circuit. Specifically, it is preferred that the highest 12 bits of the ADDRESS BUS lines be input to the end-of-file detector 220. When only a subset of address lines are utilized, the printer commands stored in the memory 200 must fill the highest block of memory addressed by the subset of address lines. If the highest block of memory would not normally be filled with printer commands, then the remainder of the highest block of memory should be filled with complementary printer commands (for example, reset commands or FFFF).

The memory 200 retrieves a pre-stored data word at an address location corresponding to the count on the ADDRESS BUS and transmits the data word to the DATA BUS. It is noted that the memory 200 may be any type of memory known in the art, for example, MASK ROM, EE PROM, E PROM, etc. When the data word has been delivered to the DATA BUS, the logic circuit 150 produces a rising edge on the STROBE line which provides an indication to the printer that the data word on the DATA BUS is valid.

The memory 200 also receives an enable signal on line 152 from the logic circuit 150. When the enable signal on line 152 is at a level which disables the memory 200 (preferably a logic 1 or about 5 volts), the memory 200 enters a "freeze mode" which disables the response of the memory 200 to the count on the ADDRESS BUS and disables the recovery of stored data words from the memory 200 to the DATA BUS. In the freeze mode, the outputs of the memory 200 are at a tri-state level. It is noted that when the enable signal on line 152 places the memory 200 in the freeze mode, the memory draws very little current (standby current) from the local power generator 110 (typically a few micro-amps).

The local power generator 110 draws electrical power from line 102 and conditions such electrical power for delivery to the electronic circuit components of the control module 20 and the image storage module 30. Specifically, power is distributed via a $V_{cc}$ line to each component of the PADS 10 which requires power (the connection of the $V_{cc}$ line to each circuit block is omitted).

Current is drawn from the printer through the interface connector 100 along line 102 and is coupled to one or more storage capacitors C3 within the local power generator 110. Through proper control of the address counter 210 and the memory 200 by the control module 20, the average current drawn from the printer along line 102 does not exceed the current delivery limitations of the printer (discussed above), despite the fact that the instantaneous current draw from the $V_{cc}$ line of the local power generator 110 may exceed the current delivery capabilities of the printer.

With reference to FIGS. 1 and 2, the memory 200 may be implemented using any of the known flash memory chips, for example, an AMD 29F016 from Advanced Micro Devices. Further, the control module 20 may be implemented using any of the known gate array chips, for example an XC3030L semi-custom chip from XILINX. One skilled in the art may program the gate array using any of the known methods to obtain the functions performed by the circuit blocks of FIGS. 1 and 2 herein.

When the control module 20 is implemented using a gate array chip, at least two additional functions may be readily attained, namely, (i) the ability to program (and re-program) the memory 200 through the interface connector 100 (called "on board programming"); and (ii) the ability to store a plurality of images in the memory 200 such that various images may be transmitted from the PADS 10 to the subject printer. These functions may be readily programmed into the gate array by those skilled in the art with reference to the data sheet of the particular flash memory used. When a flash memory is used, like the AMD 29F016, AMD publication No. 21444, Rev A, (May 1997), incorporated herein by reference, provides additional information on programming.

Moreover, when the control module 20 is implemented using a gate array chip there is no need to make the memory module 30 separable from the control module 20. Indeed, if a different image is desired, that image may be readily re-programmed into the memory 200.

It is noted that the PADS 10 may include a plurality of start switches 300 in order to cause certain of the plurality of images contained in the memory 200 to be transmitted to the printer.

Further, it is noted that the control module 20 may be implemented using an application specific integrated circuit.

Figure 3:
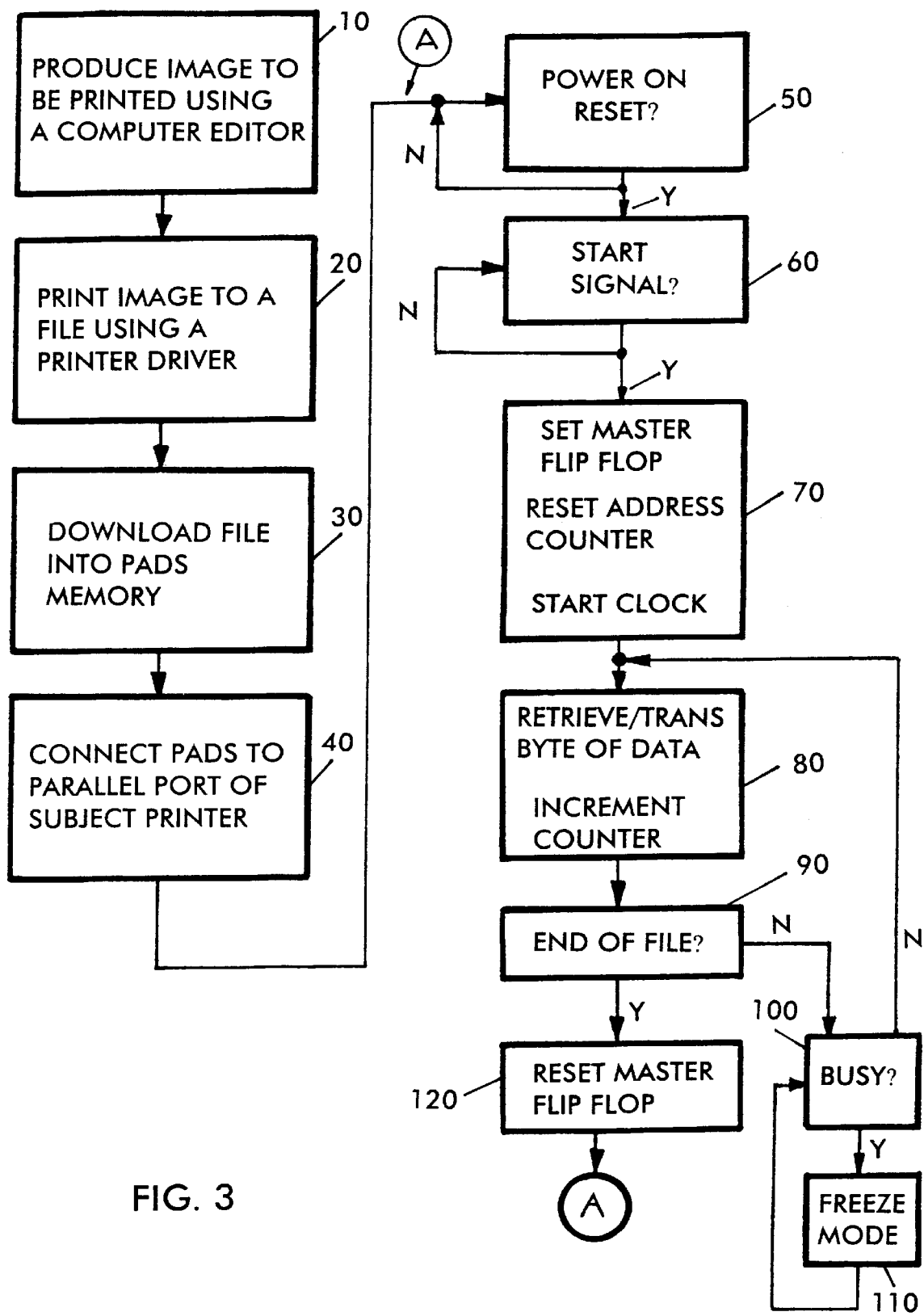
FIG. 3 is a logic flow diagram showing the operational control and protocol of the electronic circuit of the present invention.

With reference to FIGS. 1 and 3, the control steps and protocol of the present invention will be discussed in detail. At step 10 of FIG. 3, a manufacturer or user of the PADS 10 produces an image to be printed on the printer using a computer editor. For example, if a user desires to test the graphics capabilities of a subject printer, the user may produce a graphical image via a conventional graphics software package.

Once the image is satisfactory, at step 20 the image is converted to a file using a printer driver which corresponds with the printer to be tested. Thus, the file contains the proper printer control commands to exercise a particular printer. Next, at step 30 the file is downloaded into the memory 200 of the PADS 10 over the DATA BUS using a programming device. Once step 30 is completed, the PADS 10 may be transported to any remote location to test the capabilities of a subject printer.

It is noted that step 10 through step 30 need not be performed to practice the invention. Indeed, the printer control commands may be loaded into the memory 200 of the image storage module 30 in a plurality of other ways known to those skilled in the art. For example, when the control module 20 is implemented using a gate array, on board programming may be used. Further, a plurality of images may be loaded into the memory 200.

If a gate array is not used to implement the control module 20 and on board re-programmability is not available, the image storage module 30 may be disconnectable from the control module 20 such that a plurality of preprogrammed image storage modules 30 may be carried by the user to the remote location of a subject printer and, thereby, various images may be transmitted from the PADS 10 to the subject printer. Indeed, steps 10 through 30 may be performed on a plurality of image storage modules 30 such that various images are stored among the plurality of image storage modules 30.

Once the image storage module 30 contains the image or images to be printed (and the module 30 has been connected to the control module 20 if required), the PADS 10 is connected to a parallel port of the subject printer via the interface connector 100 of the PADS 10. Assuming that the subject printer has been turned on, capacitor C3 will begin to charge to the steady state voltage available on line 102 as supplied by the subject printer.

Consequently, the voltage on line 112 ($V_{cc}$) will begin to rise from 0 volts up towards, for example, 5 volts. It is noted that the invention contemplates that the voltage on line 102 (and consequently on line 112) may be any voltage, with a preferred range being from 2.5 volts to 15 volts steady state. So long as the power on reset circuit 120 senses that the voltage available on $V_{cc}$ is below a predetermined threshold, the reset signal on reset line 122 remains active (preferably 0 volts), which prevents a valid STROBE signal and therefore prevents data to be transmitted from the memory 200 to the subject printer via the interface connector 100.

Accordingly, at step 50 the control module 20 continuously queries whether a power on reset has occurred. Once a power on reset signal has been received (preferably when the reset signal on reset line 122 attains a steady state value of approximately 5 volts), the master flip-flop circuit 130 stands reset and awaits input from the start switch or switches 300 (step 60).

When a user is desirous to test the capabilities of the subject printer (step 70), the user presses the start switch 300 (or one of the start switches 300 if multiple images are available) which momentarily provides an active set signal on line 302 (preferably about 0 volts), which set signal is latched by the master flip-flop circuit 130 and causes the master flip-flop circuit 130 to produce both an enabling signal on line 134 and a reset signal on line 132.

The enable signal on line 134 is input to the clock circuit 140, and, in addition, the clock circuit 140 receives a BUSY signal from the subject printer through the interface connector 100. Thus, the clock circuit is enabled when both the signal on line 134 and the BUSY signal permit. The reset signal on line 132 resets the address counter 210 to begin counting from a predetermined value (preferably 0).

Next, at step 80, a data byte is retrieved from the memory 200 which corresponds to the count value on the ADDRESS BUS. The data byte is then transmitted over the DATA BUS, through the interface connector 100 and to the subject printer. The address counter 210 is then incremented and a new count value is presented on the ADDRESS BUS to address the next memory location in memory 200. It is noted that the addressing function for the memory 200 may be implemented in any of the other known ways. Further, when multiple switches 300 are available, the addressing function provides that the addresses of the desired image (from the plurality of images available) are used.

At step 90, the end-of-file detector 220 performs an inquiry as to whether the end of the file containing the image to be printed has been reached. Assuming that the end-of-file has not been reached, a query as to whether a BUSY signal has been received is made. It is noted that step 100 indicates that the inquiry as to whether a BUSY signal is present is made only after step 90. However, the present invention contemplates that a BUSY signal can be received at any time after a power on reset has been received and the control module 20 will respond appropriately. A busy signal (a printer buffer signal) may be generated by a data buffer in the printer when the data buffer is full.

Specifically, when a BUSY signal is received, the control module 20 and the image storage module 30 go into a freeze mode at step 110. More particularly, a BUSY signal is input to the clock circuit 140 and the logic circuit 150 such that the clock circuit is inhibited. When the clock circuit 140 has been inhibited, the address counter 210 ceases to increment and, therefore, draws very little current from the $V_{cc}$ line. It is noted that the address counter 210 does not change the count value while in the freeze mode and, therefore, when the address counter exits the freeze mode incrementation continues from the count value which existed when the freeze mode was entered.

When a level is presented on line 152 which is to disable the memory 200 (preferably logic 1 or 5 volts), the memory 200 ceases to respond to the count value on the ADDRESS BUS and ceases to present a data byte on the DATA BUS. Consequently, the memory 200 draws very little current from the $V_{cc}$ line of the local power generator 110. Typically, when the control module 20 and image storage module 30 have entered the freeze mode, only a few micro-amps are drawn from the $V_{cc}$ line.

Advantageously, the present invention capitalizes on the low current draw of the control module 20 and image storage module 30 during the freeze mode which permits the capacitor C3 to charge up to or towards 5 volts via the line 102. However, when C3 draws current from the subject printer through the interface connector 100, the maximum current draw permitted by the subject printer is not exceeded. Thus, capacitor C3 stores energy obtained from the subject printer for later use when the control module 20 and image storage module 30 leave the freeze mode.

Once the BUSY signal indicates that the subject printer is again ready to receive additional control instructions from the PADS 10, the control module 20 and the image storage module 30 leave the freeze mode and return to step 80, namely, to retrieve the next data byte from the memory 200 for delivery to the subject printer via the interface connector 100.

Although the current draw from the control module 20 and the image storage module 30 may exceed the maximum capabilities of the subject printer when data is transmitted from the PADS 10 to the subject printer, the energy stored on capacitor C3 is drawn upon such that the average current flowing through line 102 is within the current delivery capabilities of the subject printer.

Data bytes continue to be delivered from the PADS 10 to the subject printer, with the control module 20 and image storage module 30 periodically entering the freeze mode, until an end-of-file condition is sensed (at step 90).

The end-of-file detector 220 senses at least one of the highest 12 bits of the address BUS and causes a reset signal on line 222 to be produced when an end-of-file condition is present. More specifically, jumpers of a desired resistance (not shown) may be inserted between a pair of connection terminals such that when a specific count value on the ADDRESS BUS is present, indicating an end-of-file condition, the output of a twelve (12) input NAND gate (not shown) changes state and produces a reset signal on line 222. If required, such a circuit is well known in the art.

The reset signal on line 222 presents a reset signal to the master flip-flop circuit 130 which ceases the operation of the clock circuit 140, the address counter 210 and the memory 200. Accordingly, no more data is transmitted from the PADS 10 to the subject printer and the control protocol returns to step 50.

The foregoing description of the preferred embodiment of the present invention has been presented for the purposes of illustration and description. It is not intended to be exhaustive or to limit the invention to the precise form disclosed. Many modifications and variations are possible in light of the above teaching. It is intended that the scope of the invention be limited not by this detailed description but rather by the claims appended hereto.

What is claimed is:

1. A printer control circuit, comprising:
   an interface for coupling the printer control circuit to a printer;
   a data storage device adapted to release printer control command signals to the printer over the interface;
   a control circuit adapted to receive a signal from the printer over the interface which indicates that the printer cannot accept data, the control circuit producing a first signal which disables the data storage device in response to the signal; and
   a power storage device adapted to receive power from the printer over the interface, the power storage device accumulating power during the time periods the printer cannot accept data.

2. The printer control circuit of claim 1 further comprising:

an incrementor having an output signal which causes the memory device to transfer particular printer control command signals from a set of printer control commands stored therein; and a clock for producing a clock signal for causing the incrementor to change its output signal, the clock ceasing to produce the clock signal when the printer cannot accept data.

3. The printer control circuit of claim 1, wherein the power storage device includes a capacitor.

4. The printer control circuit of claim 3, wherein the power received from the printer is obtained from a standard computer hand-shaking signal.

5. The printer control circuit of claim 4, wherein the standard computer hand-shaking signal is capable of delivering a voltage which is between about 2.5 to 15 volts at a current which is between about 1 to 5 milli-amperes.

6. The printer control circuit of claim 1, wherein the data storage device is a digital data memory and the printer control command signals are transferred to the printer as digital data words over a data bus.

7. The printer control circuit of claim 6, further comprising:

a digital counter having an output count which addresses the data words stored in the digital memory; and a digital clock for incrementing the digital counter, the digital clock being disabled when the printer cannot accept data.

8. The printer control circuit of claim 7, wherein the received signal from the printer over the interface is a signal which is produced when a data buffer in the printer is full.

9. The printer control circuit of claim 8, wherein the received signal presents a voltage on an enable pin of the digital data memory to disable the memory such that the memory draws only micro-amperes of current.

10. The printer control circuit of claim 7, further comprising an end of file detector which causes the printer control to cease transferring data words to the printer when the digital counter reaches a predetermined count.

11. The printer control circuit of claim 1, further comprising:

a first housing, the data storage device being disposed in the first housing; and a second housing, the control circuit and power storage device being disposed in the second housing;

the first and second housings being disengageable such that a plurality of first housings having a plurality of differing control commands therein may be employed to affect the printer.

12. The printer control circuit of claim 1, wherein said power storage device accumulates power substantially only during the time periods the printer cannot accept data.

13. The printer control circuit of claim 1, wherein said control circuit is operable to permit the data storage device to receive the printer control command signals from an external device over the interface.

14. The printer control circuit of claim 1, wherein said control circuit and said data storage device are operable to permit the printer control command signals to represent a plurality of separate images such that each is separately releasable to the printer over the interface.

15. The printer control circuit of claim 14, further comprising one or more switches operable to cause the printer command signals corresponding to one or more of the separate images to be released to the printer over the interface.

16. The printer control circuit of claim 1, wherein said control circuit includes a gate array chip and said data storage device includes a flash memory chip.

17. A method for controlling a printer from a printer control circuit comprising the steps of:

(a) transferring data words from a digital data memory of the printer control circuit to the printer over a data bus;

(b) ceasing the transfer of data words to the printer in response to a printer buffer full signal from the printer;

(c) disabling the digital data memory such that the digital data memory draws only standby current; and (d) accumulating power in a power storage device during a time period when the printer buffer full signal indicates that the printer cannot accept data words.

18. The method for controlling a printer from a printer control circuit of claim 17 further comprising the step of resuming the transfer of data words to the printer when the printer buffer full signal indicates that the printer can again accept data words.

19. The method for controlling a printer from a printer control circuit of claim 17 further comprising the steps of:

(a1) producing an image to be printed using a computer;

(a2) printing the image to a file using a printer driver corresponding to the model of printer to be controlled; and (a3) downloading the file to the digital data memory of the printer control circuit.

* * * * *